United States Patent [19] [11] Patent Number: 4,709,984
Oestreich et al. [45] Date of Patent: Dec. 1, 1987

[54] RIBBON-SHAPED TRANSMISSION ELEMENT AND METHOD OF MANUFACTURE

[75] Inventors: Ulrich Oestreich, Munich; Ernst Mayr, Starnberg, both of Fed. Rep. of Germany

[73] Assignee: Siemens Aktiengesellschaft, Berlin and Munich, Fed. Rep. of Germany

[21] Appl. No.: 757,442

[22] Filed: Jul. 22, 1985

[30] Foreign Application Priority Data

Aug. 2, 1984 [DE] Fed. Rep. of Germany ....... 3428567

[51] Int. Cl.⁴ .............................................. G02B 6/44
[52] U.S. Cl. ................................................. 350/96.23
[58] Field of Search .............. 350/96.23, 96.29, 96.30

[56] References Cited

U.S. PATENT DOCUMENTS

| 3,718,515 | 2/1973 | Goldstein | 156/174 |
| 3,736,217 | 5/1973 | Nagao | 350/96.29 X |
| 3,883,218 | 5/1975 | Slaughter | 350/96.29 |
| 4,147,407 | 4/1979 | Eichenbaum et al. | 350/96.29 X |
| 4,302,073 | 11/1981 | Bendayan et al. | 350/96.23 |
| 4,441,787 | 4/1984 | Lichtenberger | 350/96.23 |
| 4,480,898 | 11/1984 | Taylor | 350/96.30 |
| 4,482,204 | 11/1984 | Blyler, Jr. et al. | 350/96.30 |
| 4,522,465 | 6/1985 | Bishop et al. | 350/96.30 |
| 4,547,040 | 10/1985 | Yamamoto et al. | 350/96.30 X |

FOREIGN PATENT DOCUMENTS

0104864 A2 4/1984 European Pat. Off. .
0107466A1 5/1984 European Pat. Off. .
2435432 4/1980 France .

OTHER PUBLICATIONS

Electronics & Communications in Japan, vol. 63, No. 8, 1980, pp. 69–77, "Residual Stresses of Fibers in Tape-Type Optical Cable and Their Reduction", R. Yamauchi et al.

Primary Examiner—William L. Sikes
Assistant Examiner—Akm E. Ullah
Attorney, Agent, or Firm—Hill, Van Santen, Steadman & Simpson

[57] ABSTRACT

A ribbon-shaped transmission element having a plurality of optical fibers which are provided on the outside with a thin coating of synthetic or plastic material and which are disposed side-by-side on a connecting layer, characterized by the material of the connecting layer and the thin coating being of the same material so that a good and reliable bonding is achieved in a simple fashion. The transmission element is made by forming the bonding or connecting layer and bringing it into contact with a plurality of spaced-apart moving coated fibers.

18 Claims, 5 Drawing Figures

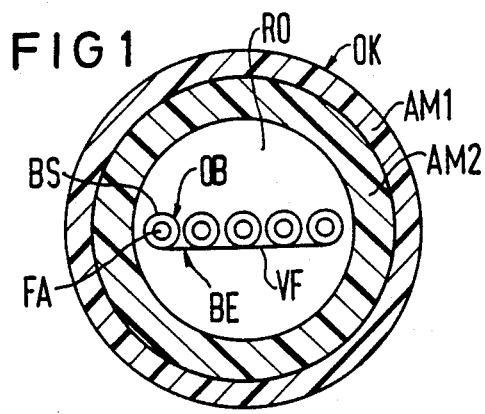
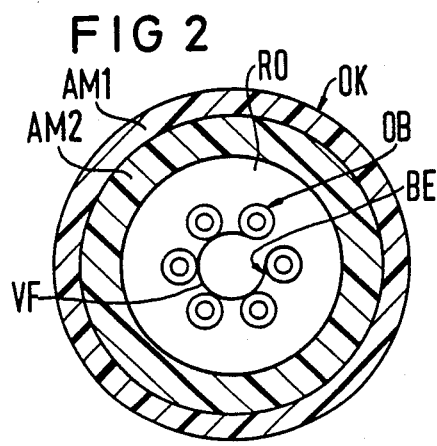
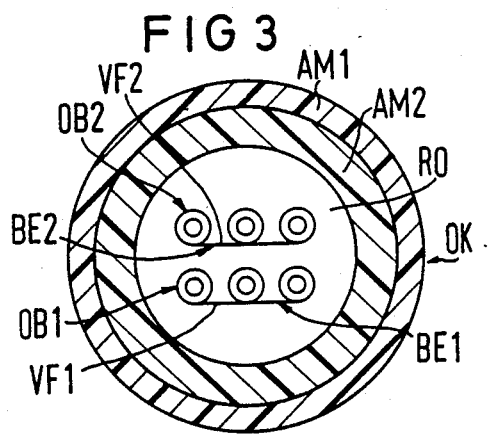
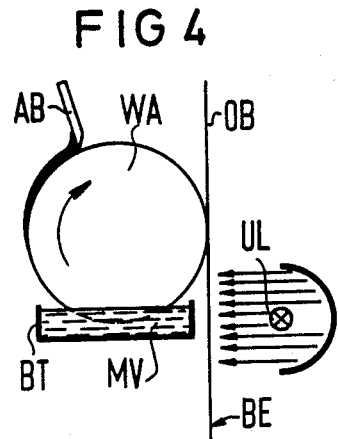
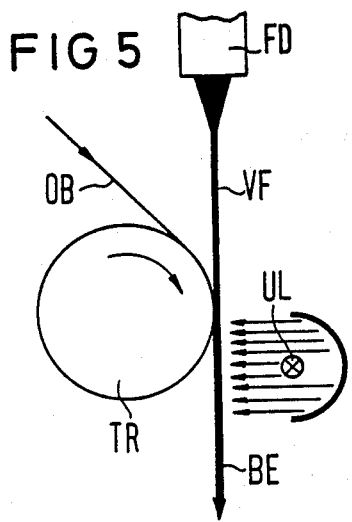

RIBBON-SHAPED TRANSMISSION ELEMENT AND METHOD OF MANUFACTURE

BACKGROUND OF THE INVENTION

The present invention is directed to a ribbon-shaped transmission element comprising a plurality of optical fibers which are disposed side-by-side on a connecting layer, a cable having the element and a method of making the element.

A ribbon-shaped transmission element comprising a plurality of optical fibers is disclosed by U.S. Pat. No. 4,147,407. As disclosed in this patent, the fibers are each provided with a plastic coating. The coating of the individual optical fibers are in contact with one another so that a ribbon-shaped structure will occur. This, however, has the disadvantage that it cannot be bent or rolled or it can only be slightly bent or rolled at right angles to its longitudinal axis because inadmissible mechanical forces and deformations would otherwise be directly transmitted via the coating onto the inwardly disposed optical fibers.

A ribbon-shaped transmission element is disclosed in U.S. Pat. No. 3,883,218. The ribbon-shaped transmission element has optical fibers composed of a core and jacket material which are disposed side-by-side with spacings therebetween on a thin paper tape. In order to secure the optical fibers in their position, an adhesive layer is provided on the paper tape with the fibers resting on this adhesive layer. Such an arrangement has the disadvantage that an additional bonding material must be applied to the connecting film which is in the form of a paper tape. In addition, it is difficult given thin layers of the bonding material to secure the optical fibers in a sufficiently good fashion. A further disadvantage of this arrangement is that the optical fibers with their coatings must be held to the relatively thick tape-shaped connecting foil via the bonding material.

SUMMARY OF THE INVENTION

The present invention is directed to an improved ribbon-shaped transmission element having a plurality of coated optical fibers extending in side-by-side relationship on a thin connecting layer which transmission element has a good and reliable connection between the optical fibers on the one hand and the carrier foil or film on the other hand. In addition, this good and reliable connection is achieved in a simple fashion such that the fibers achieve a maximum flexibility relative to one another. This is achieved in accordance with the invention in that the connecting layer is composed of the same material as the coating of the optical fibers.

Since the connecting layer is composed of the same material as the coating of the optical fibers, a bonding is possible in a simple and reliable fashion as a consequence of the identity of the materials. Work can be carried out without the employment of an additional bonding agent because the coated fibers only have to be brought into contact with the still-soft material of the expediently foil-like connecting layer in order to produce an adequately reliable connection between the two elements, namely, the outer coating of the optical fibers and the connecting layer. The fibers are held at an adequate spacing from one another by means of this connecting layer.

The invention also relates to a method for the manufacture of the ribbon-shaped transmission element which includes moving a plurality of coated optical fibers in a path with the fibers being in a side-by-side relationship, forming a connecting layer of material which is the same as the material of the coating for the optical fibers, contacting the connecting layer with the moving optical fibers to connect or secure the coated fiber to the layer to form the element. Subsequently, the plastic material of the connecting layer and coatings are hardened. In one embodiment of the method, the foil or connecting layer is formed by moving a drum moistened with the liquid material of the connecting layer into contact with the moving fibers. This method is particularly simple insofar as the film-like moistening and bridging need only be produced by the pressure roller at one side of the optical fibers lying side-by-side, this film-like moistening and bridging subsequently serving after hardening as a foil-like connecting layer of the transmission element.

In another modification of the method, the material of the connecting layer is extruded from a sheet die and is stretched and then subsequently placed on the coated optical fibers passing by with the coated optical fibers and the extruded connecting layer being in a soft condition. Here the connection between the carrier foil and the coated optical fibers is simply produced in that the latter are pressed against the connecting layer in a condition in which they are still soft. Thus, an adequate solid and reliable mounting is guaranteed as a consequence of the identical nature of the materials.

The invention is also directed to an optical cable having tubular layers forming a hollow center portion which receives the transmission element according to the present invention. Preferably the transmission element can be in a partially rolled condition which enables increasing the number of optical fibers in the center or core region of the cable.

BRIEF DESCRIPTION OF THE DRAWINGS

FIG. 1 is a cross-sectional view of an optical cable comprising a transmission element of the present invention;

FIG. 2 is a cross-sectional view of an optical cable comprising a transmission element of the present invention in a rolled-up condition;

FIG. 3 is a cross-sectional view of an optical cable comprising a plurality of ribbon-shaped transmission elements in accordance with the present invention;

FIG. 4 is a schematic illustration of an apparatus for manufacturing the ribbon-shaped transmission element according to one embodiment of the method of the present invention; and FIG. 5 is a schematic illustration of an apparatus for manufacturing the ribbon-shaped transmission element of the present invention in accordance with another embodiment of the method.

DESCRIPTION OF THE PREFERRED EMBODIMENTS

The principles of the present invention are particularly useful in making an optical transmission element OK, for example, an optical cable, which comprises a two-layer outside jacket AM1 and AM2 which form a hollow interior having a cylindrical, longitudinally extending opening RO or a hollow core. The cylindrical opening or core RO serves for acceptance of a ribbon-shaped transmission element BE. The latter is composed of a thin, elastic connecting layer VF on which waveguide elements OB are disposed in side-by-side and at a distance from one another. Each of the light waveguide elements OB comprise an optical fiber FA that is composed of a core and jacket material and the fiber FA is provided with a coating BS of plastic material to form an external coating. The outside diameter of the light waveguide element OB coated in such a fashion lies in a range of between 200 and 500 μm. The coating BS and the connecting layer VF are composed of the same material, preferably an ultraviolet curable resin so that a tight bond between the two materials can be produced in a simple fashion. The ultraviolet or UV-curable material is preferably a UV-curable acrylic resin which is employed for the coating BS and for the connecting layer VF in a particularly advantageous fashion. The illustrated optical cable can be provided with a suitable filler compound in the region of the cable core RO in order to guarantee a corresponding longitudinal tightness.

The connecting layer VF proceeds roughly tangentially to the outside surface of the coating BS of the individual light waveguide elements OB and thus also yields the possibility of allowing a rolling up of the ribbon-shaped transmission element BE. An optical cable OK having such a configuration is shown in FIG. 2 wherein the ribbon-shaped transmission element BE is rolled up such that the connecting layer VF comes to lie in the inside of a roughly circular overall structure. As a result thereof, lower outside dimensions of the optical cable OK' can be realized given the same number of fibers as in the cable OK of FIG. 1.

In another arrangement of an optical cable OK", two ribbon-shaped transmission elements BE1 and BE2 are provided in the region of the cable core RO. The transmission element BE1 has a series of light waveguide elements OB1 on a connecting layer VF1 and the transmission element BE2 has a series of light waveguide elements OB2 on a connecting layer VF2. It should be noted that these elements BE1 and BE2 are loosely received in the cable core RO and that in the preceding embodiments illustrated in FIGS. 1 and 2, the transmission element BE is also loosely received in the core RO of the respective cables OK and OK'.

The method of forming the transmission element BE has two embodiments with the first embodiment being illustrated by the apparatus of FIG. 4. In the apparatus illustrated in FIG. 4, a connecting film can be applied in a simple fashion to light waveguide elements OB which extend or lie side-by-side in a plane perpendicular to the plane of the drawing and are being moved from the top to the bottom as indicated by the arrow. A drum WA is provided for the application of the connecting layer. This drum WA turns in a conveying direction and dips into a container BT which is filled with a material MV in a liquid form for the connecting film VF according to FIGS. 1 through 3. A stripper AB is provided at an upper position relative to the drum WA and the stripper guarantees that only a correspondingly thin moistening remains on the surface of the drum WA. This moistening yields a thin connecting film between the individual light waveguide elements OB by means of contacting the series of optical elements OB at the right-hand side of the drum. In order to accelerate the curing process or cross-linking, a cross-linking device is disposed following the drum WA. This device is illustrated as being an ultraviolet or UV lamp UL. The finished ribbon-shaped transmission element BE exists after the cross-linking or curing of the material of the connecting film. Instead of the ultraviolet light UL, the cross-linking can also be insured by other ways, for example, by means of heating.

In the second embodiment of the method, light waveguide elements OB are supplied to a drum TR in a side-by-side row, namely, tangentially and obliquely from above. A sheet die FD is also provided and extrudes a connecting layer VF which emerges from the die in a soft form. The layer VF is stretched down to the necessary, low wall thickness by means of a corresponding longitudinal pull. The stretched conecting layer VF is conducted roughly tangentially past the drum TR with a certain, slight pressure against the optical elements OB which already have contacted the drum shortly before reaching the contacting location. A good mechanical connection between the connecting layer VF on the one hand and the light-conducting elements OB coated with the same material as the connecting layer VF is quickly and reliably produced in this fashion. In this case, too, an excitation by heating or UV radiation is necessary in order to accelerate the solidification process of the connecting layer VF and this can be accomplished by providing the ultraviolet lamp UL.

The spacing between the individual light waveguide elements or leads OB on the connecting layer VF should be expediently selected to be between half the outside diameter and the whole outside diameter of the coated light waveguide element. Assuming adequate absorption, the advantage of the UV irradiation lies in the high level of energy quanta and thus in the fast cross-linking.

In the invention, a flexible, ordered fiber arrangements will be produced. The transmission element with the ordered arrangement can be introduced in a known fashion into hollow leads or cores of cables, which cores may be filled under given conditions. These transmission elements can be easily taken apart during fitting, freed from the coating material and correspondingly spliced.

Although various minor modifications may be suggested by those versed in the art, it should be understood that we wish to embody within the scope of the patent granted hereon, all such modifications as reasonably and properly come within the scope of our contribution to the art.

We claim:

1. A ribbon-shaped transmission element comprising a plurality of optical fibers, each of the optical fibers being provided with a separate coating to form an optical waveguide element, and a connecting layer, said waveguide elements being disposed in a side-by-side relationship and at a distance from one another on the layer with the layer proceeding roughly tangentially to outside surfaces of the coatings and the optical waveguide elements, and the coatings of the fibers consisting of the same material as the material of the layer.

2. A ribbon-shaped transmission element according to claim 1, wherein the material of the coating of the optical elements and the connecting layer is composed of a UV-curable resin.

3. A ribbon-shaped transmission element according to claim 2, wherein the UV-curable resin is an acrylic resin.

4. A ribbon-shaped transmission element according to claim 1, wherein the wall thickness of the connecting layer is selected to be lower than the thickness of the coating on the optical elements.

5. A ribbon-shaped transmission element according to claim 4, wherein the material of the coating for the optical elements and for the connecting layer is composed of a UV-curable resin, particularly an acrylic resin.

6. In an optical cable having at least one transmission element, the improvement comprising the cable having at least one hollow opening extending along the length thereof, a ribbon-shaped transmission element being disposed in the hollow opening, said ribbon-shaped transmission element comprising a connecting layer nad a plurality of coated optical fibers being disposed in a side-by-side relationship and at a distance from one another on the connecting layer with the connecting layer proceeding tangentially to the outside surface of the biers nad the layer material and the coating material of the optical fibers being the same.

7. In an optical cable according to claim 6, wherein the ribbon-shaped transmission element is loosely disposed in said opening.

8. In an optical cable according to claim 6, wherein the transmission element is partially rolled in the longitudinal direction.

9. In an optical cable according to claim 8, wherein the partially rolled ribbon-shaped transmission element is loosely disposed in said longitudinally extending opening of the cable.

10. A method for manufacturing a ribbon-shaped transmission element having a plurality of coated optical fibers being disposed side-by-side and in a spaced relationship on a connecting layer, said connecting layer being of the same material as the material of the coatings of the optical fibers, said method comprising the steps of moving a plurality of coated optical fibers in a side-by-side and spaced relationship past a point, creating a connection layer and contacting the connecting layer with the moving fibers at said point so that the coated fibers are secured on the connecting layer in a spaced apart side-by-side relationship.

11. A method according to claim 10, wherein the step of creating the connecting layer comprises rotating a drum in a liquid batch of the material for the connecting layer to moisten the surface of the drum, said step of conducting the plurality of fibers past a point include moving them into contact with the liquid layer on the drum to secure the fibers and layer together.

12. A method according to claim 11, which subsequent to contacting the layer to the coated fiber to secure them together includes curing the material of the connecting layer and the coatings of the fibers.

13. A method according to claim 12, wherein the step of curing comprises subjecting the material of the coating of the connecting layer and the coatings to heat.

14. A method according to claim 12, wherein the step of curing comprises subjecting the fibers and layer to UV irradiation.

15. A method according to claim 10, wherein the step of creating the connecting layer comprises extruding a connecting layer from a sheet die, and stretching the extruded layer and while the layer is still soft, subsequently contacting the stretched layer with the plurality of moving optical fibers to merge the coatings and layer together.

16. A method according to claim 15, which includes curing the connecting layer after it is merged with the coated fibers.

17. A method according to claim 16, wherein the step of curing comprises subjecting the layer to UV irradiation.

18. A method according to claim 16, wherein the step of curing comprises heating the connecting layer and coated fibers.

* * * * *